United States Patent [19]

United States Patent [19]  
Trissel et al.

[11] Patent Number: 5,408,346  
[45] Date of Patent: Apr. 18, 1995

[54] OPTICAL COLLIMATING DEVICE EMPLOYING CHOLESTERIC LIQUID CRYSTAL AND A NON-TRANSMISSIVE REFLECTOR

[75] Inventors: Richard G. Trissel, Cardiff; Douglas N. DeFoe, Escondido, both of Calif.

[73] Assignee: Kaiser Electro-Optics, Inc., Carlsbad, Calif.

[21] Appl. No.: 139,480

[22] Filed: Oct. 20, 1993

[51] Int. Cl.⁶ .......................... G02B 27/14; G02F 1/13
[52] U.S. Cl. ........................................ 359/65; 359/38; 359/70; 359/629; 359/631; 359/634; 359/641
[58] Field of Search ................ 359/38, 37, 65, 70, 359/101, 641, 629, 630, 631, 632, 633, 634

[56] References Cited

U.S. PATENT DOCUMENTS

| Re. 27,356 | 5/1972 | La Russa | 350/157 |
|---|---|---|---|
| 3,940,203 | 2/1976 | La Russa | 350/3.5 |
| 4,163,542 | 8/1979 | La Russa | 350/3.72 |
| 4,859,031 | 8/1989 | Berman et al. | 350/174 |
| 4,879,603 | 11/1989 | Berman | 358/242 |
| 4,900,133 | 2/1990 | Berman | 350/346 |
| 4,987,410 | 1/1991 | Berman et al. | 340/705 |
| 5,016,985 | 5/1991 | Kalmanash et al. | 350/335 |
| 5,050,966 | 9/1991 | Berman | 359/38 |
| 5,082,354 | 1/1992 | Kalmanash | 359/70 |
| 5,210,624 | 5/1993 | Matsumoto et al. | 359/13 |
| 5,295,009 | 3/1994 | Barnik et al. | 359/48 |
| 5,319,478 | 6/1994 | Funfshilling et al. | 359/65 |
| 5,325,218 | 6/1994 | Willet | 359/53 |

Primary Examiner—William L. Sikes  
Assistant Examiner—Kenneth Parker  
Attorney, Agent, or Firm—Townsend and Townsend Khourie and Crew

[57] ABSTRACT

An optical collimating device employs an optical (concave) mirror and cholesteric liquid crystal element to collimate and project image light into the line-of-sight of an observer in efficient manner. Image light is generated with light components within a predetermined bandwidth and with a predetermined rotary sense. The image light is directed so that it is reflected by the concave mirror, expanding (collimating) the image light, projecting in onto a cholesteric liquid crystal element that reflects those components of the image light within the bandwidth B and having the proper rotary sense of circular polarization. The cholesteric liquid crystal element substantially reflects the returned image to the observer.

25 Claims, 2 Drawing Sheets

OPTICAL COLLIMATING DEVICE EMPLOYING CHOLESTERIC LIQUID CRYSTAL AND A NON-TRANSMISSIVE REFLECTOR

BACKGROUND OF THE INVENTION

The present invention relates generally to the field of visual display systems for such purposes as, for example, entertainment, training, simulation, vehicle status displays, virtual reality, machine maintenance, and the like. More particularly, the present invention relates to collimating generated image light to focus it into the line-of-sight of an observer so that it appears to be at or near infinity, yet providing high transmission of images incident thereupon.

Optical collimating apparatus have been known for some time. One example of image light collimation is described in U.S. Pat. No. Re 27,356, reissued May 9, 1972, which uses a single spherically curved combining mirror as an image forming element. A primary image is directed at the convex side of the mirror, which transmits the image to a birefringent beam splitter array, positioned on the concave side of the mirror. The array reflects the image back to the spherical mirror, which collimates the image for viewing by an observer. Several polarizing filters in the light path selectively direct that part of the primary image which returns to the spherical mirror. However, the filtering and reflection of the primary image will tend to successively reduce the intensity of the image. The result is an ultimate transmission in the neighborhood of 0.5 to 1.0 percent of the original intensity of the primary image. Thus, the image source must have sufficient power to produce an image of acceptable brightness when viewed.

Another collimating system, described in U.S. Pat. No. 3,940,203, issued Feb. 24, 1976 is a variation on the previously discussed U.S. Pat. No. Re 27,356 in that the spherical mirror is replaced with a reflection-type holographic analog of a spherical mirror. Again, a relatively large number of reflections and transmissions are employed to properly control the image light reaching the observer. By utilizing improved reflection and transmission characteristics of the holographic element, efficiency on the order of 6 to 10 percent of an image's original intensity is achieved.

Collimation apparatus will also be found in head up display (HUD) systems in cooperative association with a combiner element to superimpose a generated image on a forward field of view. In many configurations, the combiner element and the collimation apparatus require multiple filtering and reflecting of the generated image which, as indicted above, can influence the transmissivity and have a negative effect on the brightness of the image. An example of a modern system of this type is found in U.S. Pat. No. 4,859,031, issued Aug. 22, 1989. Described therein is a system that utilizes to good effect the properties of a cholesteric liquid crystal as an efficient reflector to a semi-reflective concave mirror and then as an efficient transmitter of the collimated image to an observer. The image collimating apparatus is positioned between the image source and the observer, and the generated images are first polarized to a particular rotary sense of circular polarization. So polarized, the image is transmitted to, and then reflected by, a semi-reflective mirror. This arrangement improves transmission efficiency over prior art to at best 12.5 percent of the original image intensity, but the polarization and the multiple reflection path of the semi-reflective concave mirror can still influence image intensity negatively.

Thus, there is a present need in the art for an optical collimating apparatus with improved transmissivity of images. Further, since application of such optical apparatus may include head-mounted display systems or other applications where size and weight are critical, there is a present need for such an optical collimating apparatus which is both compact and light-weight.

SUMMARY OF THE INVENTION

The present invention is directed to a compact image optical collimating apparatus with improved image transmissivity for forming an image in the line of sight of an observer, preferable at or near infinity. Alternate embodiments of the invention permit collimation in conjunction with a combiner, again with improved image intensity, and optically superimposing multiple images for viewing by an observer.

According to a preferred embodiment of the present invention, the collimation apparatus includes an image source to generate image light having components within a predetermined bandwidth and having a particular rotary sense of circular polarization, a cholesteric liquid crystal element, and a concave optical mirror. The cholesteric liquid crystal element is oriented to receive and transmit the image light to the curved (concave) surface of the optical mirror. The optical mirror operates to expand (collimate) and return the image light to the cholesteric liquid crystal element, reversing the rotary sense of the circular polarization of the image in so doing. The components of the returned image light that are within the predetermined bandwidth and with the particular circular polarization are then reflected by the cholesteric liquid crystal element onto the line of sight of an observer.

In an alternate version of the preferred embodiment of the invention, the cholesteric liquid crystal element is formed and oriented to reflect image light from the image source of predetermined rotary sense of circular polarization and wavelength onto the concave optical mirror. The optical mirror returns the image light, collimated, to the cholesteric liquid crystal element, reversing the rotary sense of the circular polarization of the image so that the returned image light is then transmitted by the cholesteric liquid crystal unit onto the line of sight of an observer. Again, image light projected from the image source of a rotary sense of circular polarization opposite that reflected by the cholesteric liquid crystal element, if any, will be transmitted by the cholesteric liquid crystal element out of the line of sight of the observer.

The present invention is capable of transmitting the generated image light to the viewer with near 100 percent intensity. In an alternate arrangement of the invention in which the image light is superimposed upon the forward-filed-of-view of the observer, intensity is reduced by approximately 50 percent.

The image source is preferably a liquid crystal display (LCD), although other image sources, such as a cathode ray tube (CRT), among many possible technologies, can be used. A liquid crystal display as the source of images produces image light that is linearly polarized and can be easily and efficiently converted to circularly polarized light by a one-quarter wave retarder with substantially no loss of intensity. Such an arrangement would yield to the observer an image intensity of at best 25 percent of the original image intensity.

One advantage of either of the embodiments of the invention is that image transmission through, and subsequent reflection from, a semi-reflective mirror, as was done in the prior art, is avoided. The invention reduces the focussing mirror's influence on image transmissivity from that of the prior art. Image transmission efficiency is increased because the cholesteric liquid crystal element is permitted to transmit and/or reflect a higher percentage of the incident light.

A second advantage of the invention is that an additional source, or a sensor, may be combined with the invention. For example, in the alternate embodiment of the invention an additional source can be located at a position opposite the original image source from the cholesteric liquid crystal element. The additional source could be used to efficiently superimpose additional information into the line of sight of the observer and/or to illuminate the image source, as might be desirable for example if the image source is a reflective device or a photo-active photonic device. A sensor could be used to record the images generated by the image source and/or the eye of the observer and/or generated images reflected by the eye of the observer for purposes of, for example, eye tracking.

In a further embodiment of the invention, two separate image sources are provided to generate images that are projected onto the cholesteric liquid crystal device. One will have that portion of the image light having a predetermined rotary sense reflected by the cholesteric liquid crystal device to the focusing mirror. The mirror, in turn, is positioned to reflect the image light back to the cholesteric liquid crystal device, reversing its rotary sense so that it will be transmitted by the cholesteric liquid crystal device into the line-of-sight of the viewer. The other image will have its image light having the predetermined image light projected directly into the line-of-sight of the viewer. In this way the invention is used to provide multiple images for viewing, one collimated and expanded, the other not.

In yet another embodiment of the invention an LCD is illuminated by a light source to produce the light image that is projected to the cholesteric liquid crystal device.

These and other advantages and features of the present invention will become apparent to those skilled in this art upon a reading of the following description of the preferred and alternate embodiments of the invention, which should be taken in conjunction with the accompanying drawings.

DESCRIPTION OF THE PREFERRED EMBODIMENT

The present invention utilizes certain properties of cholesteric liquid crystal (CLC) devices that are well known to those skilled in the art to which this invention pertains. For a more detailed discussion of those properties, reference is made to the discussions contained in U.S. Pat. Nos. 4,859,031 or 4,900,133. For completeness, but more to ensure understanding of the present invention in this single document, certain of those properties will be outlined here before discussing the details of the invention.

Cholesteric liquid crystal (CLC) devices are capable of being constructed to reflect those components of light projected on the device that are (1) within a particular bandwidth B and (2) of a particular rotary sense of circular polarization. For example, a CLC device may be constructed to reflect light components within a bandwidth B and having a right hand circular polarization (RHCP). The reflected light will keep its original rotary sense (RHCP). On the other hand, all other components of the image light incident upon the CLC device, including those with left hand circular polarization (LHCP) within the bandwidth B, will be transmitted by the CLC device without change. Conversely, of course, the CLC may also be constructed to pass or transmit light components within a bandwidth B with a RHCP rotary sense, and reflect light components having LHCP rotary sense.

Figure 1A:
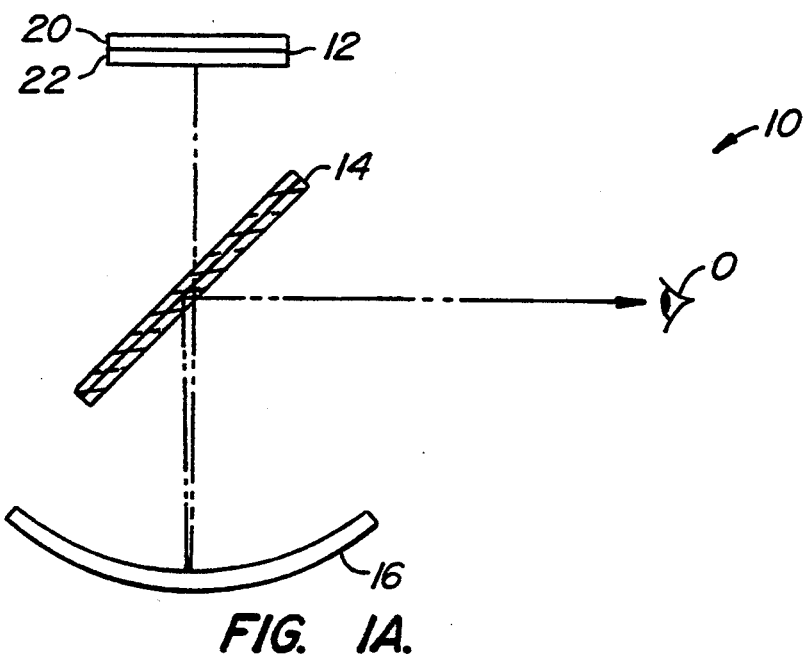
FIG. 1A illustrates an preferred embodiment of a optical collimation system according to the present invention.

Turning now to the figures, and for the moment specifically FIG. 1A, a preferred embodiment of an optical collimating apparatus according to the present invention is illustrated. Designated generally with the reference numeral 10, the optical collimating apparatus is shown including a cholesteric liquid crystal (CLC) device 14 of a type constructed to reflect image light components within a bandwidth B and having a particular circular polarization. The reflected light will, as indicated above, keep its original rotary sense. However, components of the image light incident upon the CLC device 14 not within the bandwidth B and/or not having the particular circular polarization even within the bandwidth B, will be transmitted by the CLC device 14 without change.

Although the CLC device 14 could reflect either rotary sense or handedness of circular polarization, depending upon the chemical nature of the CLC material, for the purposes of this discussion the CLC device 14 will be described as being constructed to reflect left-hand circular polarized (LHCP) image light within the bandwidth B, and to be transparent to image light within a much larger bandwidth of wavelengths of electromagnetic radiation than (but including) the bandwidth B, including RHCP image light. In essence, however, all electromagnetic radiation of the visual spectrum, except the LHCP components within the bandwidth B, will be transmitted by the CLC device 14.

Thus, FIG. 1A shows, the CLC device 14 is positioned to transmit image light from an image source 12 to a concave (as viewed from the CLC device 14) to a mirror 16, reflecting RHCP image light with the bandwidth B out of the line-of-sight of the observer O. The concave mirror 16 operates to expand (collimate) the image light received from the CLC device 14, and is positioned to reflect the image light, so collimated, back to the CLC device 14, reversing its rotary sense. Thus, the RHCP components of the image light from the CLC device 14 will be converted to LHCP components when reflected back to the CLC device 14. Those LHCP components of the mirror-reflected image light within the bandwidth B will then be reflected by the CLC device 14 into the line-of-sight of the observer O for viewing. All other components of the image light (e.g., RHCP image light) reflected by the concave mirror 16 will be transmitted by the CLC device 14 out of the line-of-sight of the observer O.

Figure 1B:
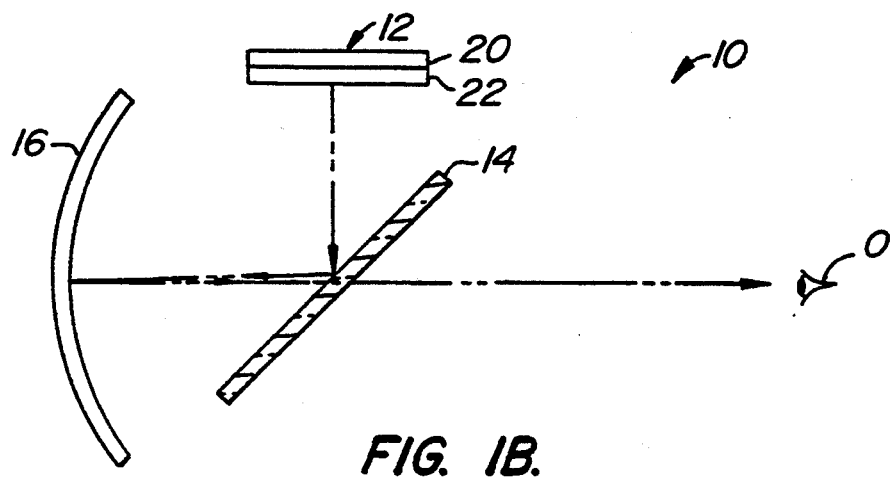
FIG. 1B illustrates an alternate embodiment of the optical collimation system of the present invention.

As FIG. 1B further illustrates, the CLC device 14 is positioned to also transmit to the observer O the forward filed of view, except for the RHCP components within the bandwidth B. The collimating apparatus 10 of FIG. 1A, therefore, will present the image produce by the image source 12 to the observer O in a manner that superimposes that image upon the forward field-of-view (viewed through the CLC device 14) with very little loss of the generated image light.

Of course the invention taught herein is susceptible of various alternate embodiments some of which are illustrated in FIGS. 1B and 2-4. Turning now for the moment to FIG. 1B, an alternate embodiment of the invention has the CLC device 14 and mirror 16 re-arranged from that shown in FIG. 1A so that both are situated in the line-of-sight of the observer (O). The image source 12 and CLC device 14 are arranged to have the RHCP components of the image light within the bandwidth B reflected by the CLC device 14 to the concave mirror 16 without reversal of its rotary sense. The mirror 16, in turn, will expand (collimate) the image, and is positioned to reflect the collimated image light back along a path to the CLC device 14, and reversing its rotary sense from RHCP to LHCP. The reflected image light, now having an LHCP rotary sense, will be transmitted by the CLC device 14 to the observer O.

In either of the embodiments of the invention shown in FIGS. 1A, 1B the image source 12 may be of a type that produces monochrome images, in which case only a portion of the light of the image (the RHCP component within the bandwidth B) will be reflected, and ultimately communicated, via the concave mirror 16 and CLC 14, as described, to the observer O. All other components of the image light will be transmitted by the CLC device 14 out of the line-of-sight of the observer O. However, preferably the image source 12 is a liquid crystal display 20, producing linearly polarized images. In the FIG. 1A embodiment of the invention the generated image will then be passed through a quarter wavelength retarder 22 which circularly polarizes the image light so that its rotary sense is LHCP; in the FIG. 1B embodiment of the invention the quarter wavelength retarder will circularly polarize the image light to have a RHCP rotary sense.

Due to the nature of the optical components used in the optical collimating apparatus, the CLC device 14 will reflect substantially all of the RHCP light incident upon it within bandwidth B and at the angle for which the cholesteric liquid crystal element was formed. Alternatively, the CLC device 14 will transmit substantially all of the LHCP light components, if any there be, incident upon it. The optical concave mirror 16 will reflect substantially all of the light incident upon it. Thus, either of the embodiments of the optical collimating apparatus 10 of FIGS. 1A, 1B will come close to transmitting nearly 100 percent of the original intensity of RHCP image light to the observer O. Constructed as described above, and used with an image source capable of inherently producing circularly polarized light (or, as in the case of the LCD 20, producing linearly polarized light which can be substantially completely converted to circular polarization by transmittance through the quarter wavelength retarder 22), a visual display system applying image collimating apparatus 10 is substantially fully efficient. If the image source 20 otherwise produces unpolarized or equally mixed polarization light, a visual display system applying image collimating apparatus 10 is substantially 50 percent efficient.

Comparing this to prior art, which is at best 50 percent or 25 percent efficient respectively for the two case of generated image light considered, the benefits provided by the present invention are apparent. The improved transmission provided by the present invention means that image source 32 need generate images at a lower power level to maintain similar visibility, or that generated with the same power the images generated by image source 32 will have improved intensity and brightness over prior art.

The curvature of the mirror 16 is preferably spherical, although other curvatures can also be used, and may even be preferred, depending upon the particular application. Further, the mirror 16 may be half-silvered so that it the observer O is provided with a forward view of the horizon with the image generated by the image source 12 superimposed thereon. With the mirror 16 partially reflective, partially transmissive, the optical collimating apparatus 10 functions both as a collimator for the generated image, and a combiner, combining the forward horizon image with the image produced by the image source 12.

Figure 2:
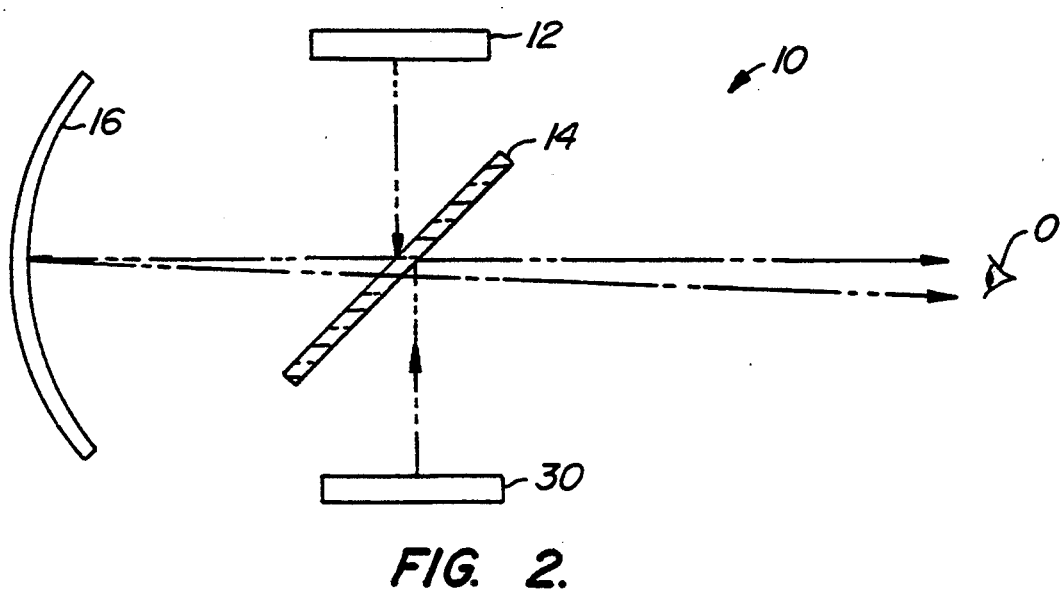
FIG. 2 illustrates a further embodiment of the invention that superimposes upon the collimated image produced by the image system of FIG. 1B a second generated image.

Turning now to FIG. 2, a further embodiment of the optical collimating apparatus 10 is shown. Here, in FIG. 2, the optical collimating apparatus 10 arranged as in FIG. 1B is used in conjunction with a second image source 30 to superimpose a second image upon that from the image source 12 for viewing by the observer O. As FIG. 2 illustrates, a second image source 30 is provided to produce a second generated image with components of a RHCP rotary sense within the bandwidth B. This second image with be projected onto the CLC device 14. Due to the RHCP rotary sense of the second image it will be reflected into the line-of-sight of observer O—superimposed upon the first generated image produced by the image source 12 upon that produced by the image source 12.

The second image may be collimated or un-collimated, as desired. If a collimated second image is desired or necessary, it will need to be collimated such as, for example, by placing a collimating lens between the image source 30 and the CLC device 14 to receive the image light and transmit in collimated form.

Figure 3:
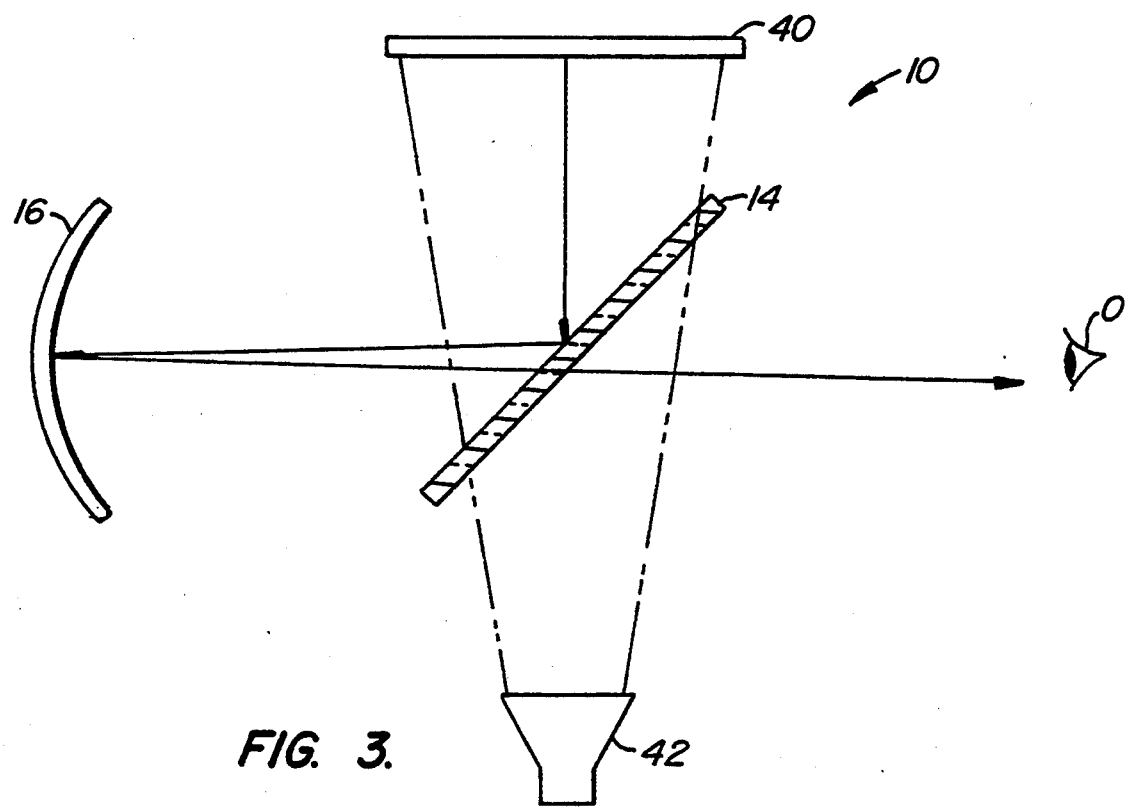
FIG. 3 illustrates yet another embodiment of the invention in which a light source is used to illuminate an image source to project the generated image thereby to the collimating apparatus of FIG. 1B.

As indicated above, the image sources 12 and/or 30 are advantageously LCD devices with backlighting to produce the image light. In some circumstances it may be desirable to use an LCD device having no backlight capability in the optical collimating apparatus. If so, the LCD device used must be illuminated to produce the generated image light, and FIG. 3 is an illustration of an embodiment of the invention using such an LCD device. Here, as FIG. 3 shows, the collimating apparatus 10 collimates incorporates and image source 40 having no backlight capability, and is therefore illuminated by a light source 52. The image so generated by illuminating the image source 40 is projected along onto a cholesteric liquid crystal element 44 that is constructed and oriented to reflect an image having RHCP components within bandwidth B. The RHCP components within the bandwidth B of the image light produce by the image source 40 is reflected by the CLC device 14 to a concave mirror 16 without reversing its rotary sense. The concave mirror 46, in turn, reflects the image back to the CLC device 14, reversing its rotary sense, so that it is now LHCP light. The CLC device 14 will transmit the image light into the line of sight of the observer O.

Not shown in the embodiment of the invention of FIG. 3 uses is the quarter wavelength retarder used to circularly polarize (to RHCP) the linearly polarized light reflected from the liquid crystal display 40.

Figure 4:
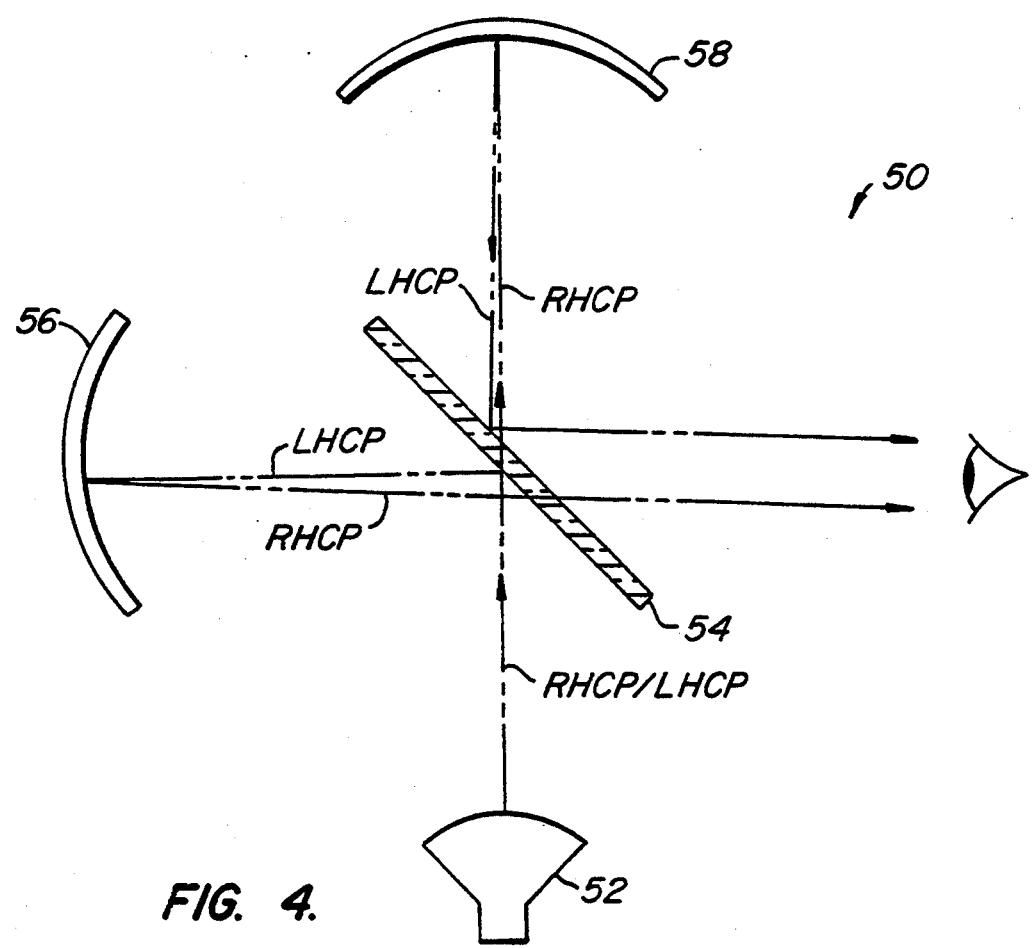
FIG. 4 is still another embodiment of the invention, illustrating a collimating system capable of collimating unpolarized light with near 100 per cent transmissivity.

Referring now to FIG. 4 there is illustrated an embodiment of the invention that projects and collimates a generated image into the line of sight of an observer O with substantially 100% of the generated light. As with the embodiments discussed above, the CLC device used in the embodiment of FIG. 4 is constructed to reflect light components with a RHCP rotary sense and within the bandwidth B, while transmitting all other components (within the visual range of the spectrum). Thus, as FIG. 4 shows, a collimating system, designated generally with the reference numeral 50, includes an image source 52 that generates image light having both a LHCP rotary sense and a RHCP rotary sense within the bandwidth B. The generated image light is projected so that it is incident upon a CLC device 54 that is constructed as described above. The RHCP rotary sense component of the generated image light is reflected by the CLC device 54 to a concave mirror 56. The concave mirror 56 collimates and reflects the generated image light, reversing its rotary sense, back to the CLC device 54 which transmits the image light into the line of sight of the observer O.

At the same time, the LHCP components of the generated image light from the image source 52 are transmitted by the CLC device 54 to a second concave mirror 58. The concave mirror 58 collimates and reflects the received image light back to the CLC device 54, reversing its rotary sense from LHCP to RHCP. The CLC device 54 will then reflect the RHCP components within the bandwidth B from the concave mirror 58 into the line-of-sight of the observer. Thus, the observer receives both the LHCP and RHCP components of the generated image projected into the collimating system 50 by the image source 52, providing that image with near 100% transmissivity.

In general, those skilled in the art to which this invention relates will recognize that many changes in construction and widely differing embodiments will suggest themselves without departing from its spirit and scope. For example, the composition of cholesteric liquid crystal element may be such that its has a bandwidth of maximum reflection centered at a wavelength of ones choosing. Likewise the bandwidth of maximum reflection around the wavelength may be varied as a function of the cholesteric liquid crystals composition. Also, several cholesteric liquid crystal elements covering different bandwidths can be stacked together to provide wider bandwidth operation.

Further, the physical arrangement of components of the invention may be varied with specific results. For example, cholesteric liquid crystal element 34 may be formed on a curved surface to impart optical power to the image and thereby to improve optical performance of a system incorporating the present invention, or with the same performance to alleviate the optical power required of the optical concave mirror.

Further, the mirrors used in the various embodiments of the invention described herein may be formed to a variety of shapes, for example aspheric, flat or convex, so as to satisfy differing requirements of particular display systems envisioned.

Further still, relying on the property of cholesteric elements that the wavelength of maximum reflection is angle sensitive (i.e. as the angle of incidence increases, the wavelength of maximum reflection is shifted toward the shorter wavelengths) the wavelength of maximum reflection of the cholesteric liquid crystal element for incident light at an implemented system design nominal angle may be increased to compensate for the shift toward shorter or longer wavelengths of reflection at other angles of incidence. This property can be further applied to impart correction of chromatic aberrations which may otherwise be present in a system incorporating the present invention arising from the chromatic effects of any refractive materials in the system, or with the same chromatic effects to alleviate the requirements of those other refractive materials.

Thus the disclosures and descriptions herein are purely illustrative and are not intended to be in any sense limiting.

What is claimed is:

1. An optical collimating apparatus for focussing an image at infinity or at a desired finite distance as viewed by an observer, the image being formed by an image means to include circular polarized image light having components within a predetermined bandwidth and of a first rotary sense of circular polarization, the apparatus comprising:

a cholesteric liquid crystal element of the type reflective to light within the predetermined bandwidth and of a first rotary sense of circular polarization; and a non-transmissive optical mirror positioned to receive and reflect the image light to the cholesteric liquid crystal element, reversing the rotary sense of circular polarization in so doing;

whereby the cholesteric liquid crystal element and the optical mirror are arranged and positioned so that image light from the image means is reflected or transmitted by the cholesteric liquid crystal element then received and reflected by the optical mirror with reversal of the rotary sense of the image light components to the choesteric liquid crystal element and into the line-of-sight of the observer.

2. The optical collimating apparatus of claim 1, wherein the image light received by the optical mirror for reflection to the cholesteric liquid crystal element includes image light components within the predetermined bandwidth and with the a rotary sense of circular polarization opposite from the first rotary sense of circular polarization.

3. The optical collimating apparatus of claim 1, wherein the cholesteric liquid crystal element transmits the image light components reflected to it by the optical mirror into the line of sight of the observer.

4. The optical collimating apparatus of claim 1, wherein the cholesteric liquid crystal element reflects the image light components reflected to it by the optical mirror into the line of sight of the observer.

5. The optical collimating apparatus of claim 1, wherein the image means includes liquid crystal means for forming the image light.

6. The optical collimating apparatus of claim 5, including means for circularly polarizing the image light formed by the liquid crystal means.

7. An optical collimating apparatus for focussing an image at infinity or at a desired finite distance as viewed by an observer, the image being formed by an image means to include image light having components within a predetermined bandwidth and of a predetermined rotary sense of circular polarization, the apparatus comprising:
 a cholesteric liquid crystal element of the type reflective to light of the predetermined bandwidth and the predetermined rotary sense of circular polarization; and
 a non-transmissive optical mirror;
 whereby the cholesteric liquid crystal element and the optical mirror are arranged and positioned so that the image light from the image means is projected onto the cholesteric liquid crystal element, and the components of the image light having the predetermined bandwidth and rotary sense are reflected to the optical mirror to be reflected back to the cholesteric liquid crystal element and into the line-of-sight of the observer.

8. The apparatus of claim 7, wherein the optical mirror includes a concave, reflective surface operating to receive and expand the image light reflected by the optical mirror to the cholesteric liquid crystal element.

9. An optical collimating apparatus for focussing image light into the line-of-sight of an observer for viewing as if at infinity or at a desired finite distance from the observer, the apparatus comprising:
 image means for generating an image having light image components within a predetermined bandwidth and having at lease a first rotary sense;
 reflecting means positioned to receive the light images from the image means for reflecting the light image components, and for transmitting light images having a second rotary sense opposite from the first rotary sense; and
 non-transmissive optical means positioned to receive and reflect back to the reflecting means and into the line-of-sight of the observer the light image components reflected by the reflecting means, the optical focussing means including means for reversing the rotary sense of the received image light components.

10. The optical collimating apparatus of claim 9, wherein the reflecting means is positioned and constructed to superimpose the light images from the image means onto a forward field of view of the observer.

11. The optical collimating apparatus of claim 10, wherein the optical means is an optical mirror having a concave reflecting surface for receiving and reflecting light images back to the reflecting means.

12. The optical collimating apparatus of claim 11, wherein the curved surface is spherical.

13. The optical collimating apparatus of claim 9, wherein the reflecting means is a cholesteric liquid crystal element.

14. The optical collimating apparatus of claim 13, wherein said image means is a liquid crystal display device operating to produce linearly polarized light, and including means for converting the linearly polarized light to at least the first rotary sense.

15. The optical collimating apparatus of claim 14, wherein the converting means is a one-quarter wave retarder element.

16. The optical collimating of claim 9, including a second image means operating to produce and second image having light components within the predetermined bandwidth and of the predetermined rotary sense, the image means being relatively positioned so that the light components of the second image are reflected by the reflecting means directly to the observer.

17. The optical collimating apparatus of claim 9, including light generating means for projecting light onto the image means to produce at least the image light components.

18. A method for optically collimating an image at infinity or at a desired finite distance from an observer, comprising the steps of:
 causing to be incident upon a cholesteric liquid crystal element image light having image light components within a predetermined bandwidth and of a predetermined rotary sense of circular polarization, the cholesteric liquid crystal element being constructed to be reflective to image light components of the predetermined bandwidth and of the predetermined rotary sense;
 positioning the cholesteric liquid crystal element to reflect said image light components to an optical focussing mirror;
 positioning a nontransmissive focussing mirror to reflect the image light components back toward said cholesteric liquid crystal element; and
 transmitting the image light components reflected from the optical focussing mirror to said observer.

19. An system for collimating and projecting an image into the line of sight of an observer, comprising:
 image generating means for producing the image having at least image light components within a predetermined bandwidth and of first and second rotary sense of circular polarization, the first rotary sense being opposite form the second rotary sense;
 reflecting means constructed to be transmissive to the image light components within the predetermined bandwidth and of the first rotary sense and to be reflective to the image light components within the predetermined bandwidth and of the second rotary sense;
 a first optical mirror; and
 a second optical mirror;
 whereby the reflecting means is relatively positioned
  (1) to receive the image and to transmit the image light components within the predetermined bandwidth and of the first rotary sense to the first optical mirror for reflection back to the reflecting means with the rotary sense reversed to reflect the image light components from the first optical mirror into the line of sight of the observer, and
  (2) to reflect the image components from the image source within the predetermined bandwidth and of the second rotary sense to the second optical mirror for reflection back to the reflecting means with reversal from the second rotary sense to the first rotary sense to transmit the image light components from the second optical mirror into the line of sight of the observer.

20. The system of claim 19, wherein the image means is a liquid crystal device.

21. The system of claim 19, wherein there is included a one-quarter wavelength retarder for transmitting the image light of the liquid crystal device to the reflecting means.

22. The system of claim 21, wherein the reflecting means is a cholesteric liquid crystal element.

23. The system of claim 22, wherein the first and second optical mirrors each include curved surfaces for receiving and reflecting image light from the reflecting means.

24. The system of claim 23, wherein the curved surface of the first and the second optical mirrors is spherical.

25. The system of claim 19, wherein the reflecting means includes a cholesteric liquid crystal element.

* * * * *